United States Patent [19]

Hutson

[11] Patent Number: 4,627,237
[45] Date of Patent: Dec. 9, 1986

[54] HYDROSTATIC TRANSMISSION WITH FIXED FLUID CAPACITY RATIO BETWEEN PUMP AND MOTOR

[75] Inventor: Allan I. Hutson, Rockford, Ill.

[73] Assignee: Sundstrand Corporation, Rockford, Ill.

[21] Appl. No.: 595,167

[22] Filed: Mar. 30, 1984

[51] Int. Cl.⁴ .............................................. F16D 33/02
[52] U.S. Cl. ....................................... 60/487; 60/490; 60/491
[58] Field of Search ................. 60/487, 489, 490, 491; 417/220; 418/30, 24

[56] References Cited

U.S. PATENT DOCUMENTS

| | | | |
|---|---|---|---|
| 1,510,406 | 9/1924 | Lewis | 180/72 |
| 2,485,240 | 10/1949 | Jackson | 60/487 |
| 2,928,295 | 3/1960 | Boulanger | 60/487 |
| 3,224,198 | 12/1965 | Schimkat | 60/491 |
| 3,252,284 | 5/1966 | Von Thuegen | 60/491 |
| 3,632,238 | 1/1972 | Searle | 418/225 |
| 3,791,779 | 2/1974 | Nelson | 418/30 |

FOREIGN PATENT DOCUMENTS 788035  7/1935  France ................................ 60/487

Primary Examiner—Robert E. Garrett
Assistant Examiner—John M. Husar
Attorney, Agent, or Firm—James A. Wanner; Ted E. Killingsworth; Harold A. Williamson

[57] ABSTRACT

The present invention is directed to a compact, lightweight and inexpensive hydrostatic transmission which in the preferred form has a variable displacement and reversible pump placed in side-by-side relationship with a fluid motor and wherein the transmission has a multi-section housing with a uniform width center section forming both the pump chamber and the motor chamber. The fluid capacity of the pump and the fluid capacity of the motor are proportional to their widths and the ratio of the fluid capacity remains constant as various width center sections are used.

23 Claims, 8 Drawing Figures

HYDROSTATIC TRANSMISSION WITH FIXED FLUID CAPACITY RATIO BETWEEN PUMP AND MOTOR

FIELD OF THE INVENTION

This invention relates to a hydrostatic transmission wherein a single housing encloses a pump and motor, both of which are of the type wherein the volume of each hydraulic unit is proportional to the width thereof and wherein the pump and motor are in side-by-side relationship with the pump and motor being of the same width.

BACKGROUND OF THE INVENTION

It is well known in the hydraulic pump and motor art that certain types of hydraulic units have rotary elements which are in contact with the working fluid and wherein the capacity of the unit is proportional to the axial width of the unit. Such units include the vane type, the roller vane type, gearing units, gear type and gerotor type, among others. One example of such hydraulic unit is McKittrick U.S. Pat. No. 3,373,693 issued Mar. 19, 1968. It is also recognized in the hydrostatic transmission art that a fluid pumping unit of one type can be connected in fluid communication with a hydraulic motor unit of either the same type or another type so that the rotary input to the pump causes fluid flow to the motor to provide a rotary output. Quite often in hydrostatic transmissions, the pump and motor are in separate housings such as taught in Musick et al. U.S. Pat. No. 2,307,851 issued Jan. 12, 1943. It is also well known in hydrostatic transmissions to have the pump and motor housings abut each other so as to eliminate the need for external hoses or other fluid communication means between the two housings. Brown et al. U.S. Pat. No. 3,751,924 issued Aug. 14, 1973 and Costomski U.S. Pat. No. 3,996,841 issued Dec. 14, 1976 teach examples of such pump and motor combinations.

SUMMARY OF THE INVENTION

The improved hydrostatic transmission of the present invention utilizes a pump and a motor, each of which are of the rotary type wherein the capacity is proportional to the axial width of the unit and wherein both are positioned in side-by-side relationship within a common housing. Furthermore, with the axial width of both units being the same, a housing center section of uniform width provides chambers for the rotating elements of both the pump and motor. Preferably, both the pump and motor have side porting and the fluid communication between the pump and motor are provided in side housings which abut the center section and eliminate the need for external hoses connecting the pump and motor. Such housing construction with two side housings abutting the center section to form the pump and motor chambers provides the desirable feature of permitting use of various width center sections to provide compact transmissions of varying capacity merely by selecting the width of the center section while utilizing the same side housings. In such arrangement, the ratio of the pump capacity relative to the motor capacity is maintained as various width center sections are utilized.

There is another object of the preferred form of the present invention to provide a reversible and variable capacity hydrostatic transmission wherein one of the hydraulic units, generally the pump, is of the variable capacity type and may also be reversible in hydraulic action so that a single direction input to the pump transmission provides a reversible and variable ratio output from the motor of the transmission. This is particularly advantageous in providing a hydrostatic transmission for a vehicle. Where one of the units is of variable capacity, the maximum capacity of such unit has a fixed ratio relative to the fluid capacity of the other unit and such capacity ratio is maintained regardless of the width of the center section utilized.

It is another object of the present invention to provide an inexpensive, compact and lightweight hydrostatic transmission such as might be used in a garden tractor or lawn tractor. For such unit, it is desirable to have both the input and output shafts extend from the same housing side sections with the pulley of the transmission drive shaft being in alignment with the pulley of the motor driven shaft. With such construction, the transmission can easily be placed in the tractor previously designed to have a single long drive belt extending from a forwardly located vertical axis motor to a rearly located differential or transaxle at the rear wheel axle. With a hydrostatic transmission inserted in such drive, a shortened belt interconnects the engine pulley with the transmission input pulley and a second belt may interconnect the transmission output pulley with a pulley for a differential or transaxle, with all pulleys in a common plane. It is also possible to directly connect the driven shaft of the hydrostatic transmission to the input of the differential or transaxle. Such arrangements provide the features of reversibility and infinite ratio speed change of a hydrostatic transmission in a tractor previously not having such features without expensive modifications. When the hydrostatic transmission is utilized with a multiple speed transaxle, multiple speed ranges of vehicle operation are obtained. Due to the reversibility of the hydrostatic transmission, a reverse gear in such transaxle can be eliminated and due to the speed change capability of the hydrostatic transmission, the number of transaxle mechanical gear ratios may be reduced.

It is another object of the present invention to provide a hydrostatic transmission comprising a hydraulic pump driven by an input shaft and in fluid communication with a hydraulic motor having an output shaft, the pump has a pump rotating element which generates a pumping action and is connected to the input shaft, the motor has a motor rotatable element connected to the output shaft and subjected to fluid flow from the pump to provide a rotating output to the output shaft. A transmission housing provides a pumping chamber containing the pump rotating element with the fluid capacity of the pump being substantially proportional to the width of the pumping chamber and a motor chamber containing the motor rotatable element with the fluid capacity of the motor being substantially proportional to the width of the motor chamber wherein the width of the motor chamber is the same as the width of the pumping chamber and the pumping chamber and the motor chamber are in side-by-side relationship.

It is another object of the present invention to provide a variable ratio hydrostatic transmission comprising a housing having a hydraulic pump driven by an input shaft and in fluid communication with a hydraulic motor having an output shaft with one of the pump and motor being of variable displacement, the pump having a pump rotating element which generates a pumping action and is operatively connected to the input shaft, the motor having a rotatable motor element operatively connected to the output shaft and subjected to fluid flow from the pump to provide a rotating output and where the housing has a constant width center section located between a pair of side sections with the center section having a first opening of uniform cross section forming a pumping chamber extending the width of the center section and containing the pump rotating element and having a second opening of uniform cross section forming a motor chamber extending the width of the center section and containing the motor rotatable element. The pumping motor chambers are in side-by-side relationship and perpendicular to the input and output shafts with the pump having a fluid capacity substantially proportional to the width of the pump chamber and the motor having a fluid capacity substantially proportional to the width of the motor chamber.

It is another object of the present invention to provide a hydrostatic transmission adapted to propel a vehicle having a spaced apart engine and a drive axle, the hydrostatic transmission including a variable displacement hydraulic pump and a hydraulic motor mounted within a single multi section housing with the hydraulic pump and motor being in side-by-side relationship and in fluid communication with each other. The pump has a pump rotating element connected to an input shaft and the motor has a motor rotatable element connected to an output shaft with the pump input shaft being driven by the engine and the motor output shaft driving the axle. The housing has a constant width center section located between a pair of side sections. The housing center section is substantially the same width as the pump and the motor with the housing center section having a first constant cross section opening passing therethrough to form a pump chamber containing the pump rotating element with the pump having a maximum fluid capacity proportional to the width of the pump chamber and the central housing section having a second constant cross-section opening passing therethrough to form a motor chamber containing the motor rotatable element with the motor having a fluid capacity proportional to the width of the motor chamber, and the pump chamber and the motor chamber are of the same width substantially equal to the width of the center section.

BRIEF DESCRIPTION OF THE PREFERRED EMBODIMENT

Figure 1:
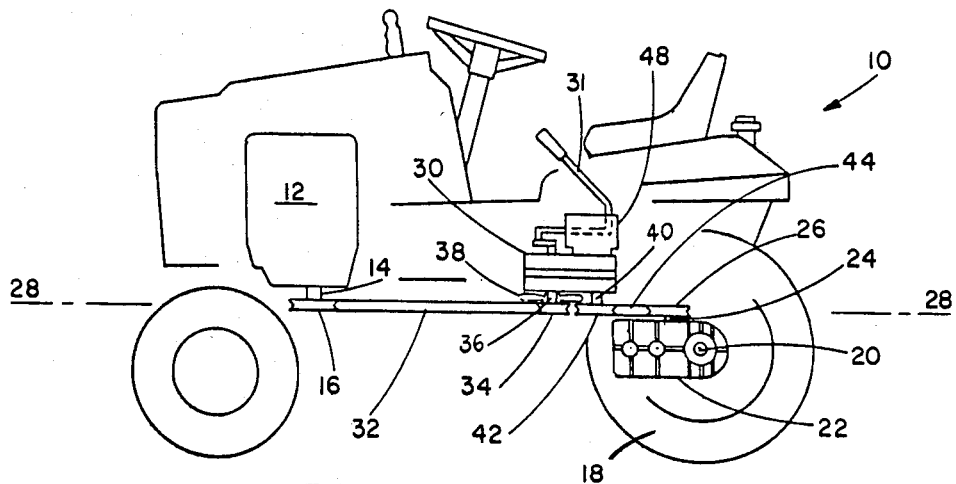
FIG. 1 is the side view, partly broken away, of a lawn tractor which can utilize the hydrostatic transmission of the present invention and shows the relative orientation of the drive train.

The present invention is directed to a lightweight, inexpensive and compact transmission which is adaptable for various uses but is particularly adapted for use in the propulsion system of a lawn or garden tractor. FIG. 1 shows a front engine lawn tractor 10 which is a particularly desirable environment for utilizing such transmission. The front engine lawn tractor is sometimes referred to as a front engine lawn tractor and such reference is utilized herein. The front engine lawn tractor 10 has a forwardly located engine 12 with a vertical shaft 14 mounting an engine pulley 16. The rear end of the front engine lawn tractor 10 is provided with a pair of driving wheels 18 mounted on an axle 20 driven by a differential or transaxle 22. In many prior front engine lawn tractors a transaxle is utilized which is the mechanical transmission integrated with a differential and has a plurality of forward speeds plus a reverse gear. The differential or transaxle 22 is normally provided with a vertical shaft 24 having a differential pulley 26. For simplicity and economics in construction of the front engine lawn tractor 10, it is also common to have both the engine pulley 16 and the differential pulley 26 located in a common horizontal plane represented by line 28 in FIG. 1 with the two pulleys interconnected by a long drive belt. However, when the front engine lawn tractor 10 utilizes the hydrostatic transmission of the present invention represented by 30 of FIG. 1, the previous long drive belt is replaced by a drive belt 32 interconnecting the engine pulley 16 with a pump pulley 34 mounted on an input shaft 36 for the hydrostatic transmission 30. The input shaft 36 may also mount a cooling fan 38 utilized to blow ambient air over the housing of the transmission 30. The transmission 30 is also provided with an output shaft 40 which can mount a motor pulley 42 which is connected to the differential pulley 26 by means of a driven belt 44. In such an arrangement, all four pulleys, that is the engine pulley 16, the pump pulley 34, the motor pulley 42 and the differential pulley 36, along with the drive belt 32 and the driven belt 44 are all located in the same previously mentioned horizontal plane 28. This permits the utilization of the hydrostatic transmission 30 on previously designed front engine lawn tractors without major redesign or major retooling of the tractor. Another alternative mounting of the transmission 30 places the transmission 30 further to the rear of the front engine lawn tractor 10 with the vertical transmission output shaft 40 in alignment with the vertical shaft 24 of the differential. With the transmission 30 in such alternate location, the shafts 40 and 24 can be connected by a simple mechanical coupling and eliminate the need for pulleys 26 and 42 and the driven belt 44.

Figure 1A:
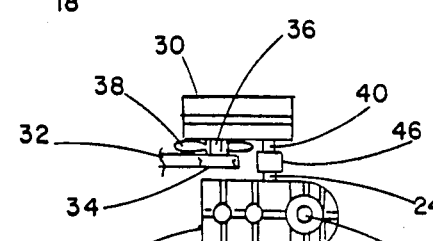
FIG. 1a shows an alternative arrangement wherein the hydrostatic transmission is directly coupled to the tractor differential.

With the hydrostatic transmission 30 of the present invention, inherent characteristics of a hydrostatic transmission, such as infinite selection of speed ratios, can now be utilized by the front engine lawn tractor 10. This can eliminate any need for a mechanical gearing and thus the unit 22 driving the axle 20 can be a single speed differential. For a more deluxe version of the front engine lawn tractor 10, a transaxle unit may be utilized with the mechanical transmission portion of the transaxle being utilized to provide different speed ranges of operation of the front engine lawn tractor 10. This alternative arrangement is shown in FIG. 1a with the coupling 46 being substituted for the second belt drive. Due to the speed changing characteristics and reversibility of the hydrostatic transmission 30, the transaxle 22 (gear shift not shown) on the more deluxe version can be made much more simply than previous transaxles since no reverse gear is needed and the number of speed changes can also be reduced.

While the hydrostatic transmission of the present invention has many uses, it is particularly desirable to garden and lawn garden tractors. Generally, a garden tractor is heavier built than a lawn tractor and is designed to provide functions in addition to the normal mowing and snow plowing functions. Thus, generally the garden tractor has a larger engine and all of the horsepower is provided to the rear wheels to the transmission for such functions as plowing, disking, or pulling heavy loads especially up hills. While a transmission of the present invention could be utilized in such environment, they are particularly suitable for the front engine lawn tractor application since functions are primarily directed to mowing lawns and plowing snow. front engine lawn tractors generally have lower horsepower ratings than garden tractors and thus may use a less rugged transmission. Furthermore, while all the front engine lawn tractor's horsepower can be used during mowing, it has been determined more than half of the tractor's horsepower is used to drive the mower blades while less than half of the horsepower is used for vehicle propulsion during mowing. While such percentages can change due to instantaneous load conditions such as mowing up steep hills, such heavy loading of the transmission only occurs during a small time portion of use. Furthermore, during a snow plowing operation where all horsepower utilized is transmitted through the front engine lawn tractor transmission to the rear wheels, such operation seldom utilizes all of the horsepower available. Even when pushing heavy snow, meeting an obstacle, or when weighted during testing, the tractor wheels slipped without the tractor engine showing signs of "lugging", indicating that more horsepower was available than was being applied to the ground. Due to the lower horsepower rating and due to the low propulsion requirements of the front engine lawn tractor, the compact, lightweight and inexpensive transmission of the present invention is particularly desirable for such application.

The particular construction of the hydrostatic transmission 30 is shown in FIGS. 2-7. Preferably, the transmission 30 has a 3-piece housing shown in FIGS. 3 and 5 consisting of a center section 50, a lower side section 52 and an upper side section 54. The center section 50 has a width W and is trapped between the two side sections 52 and 54. The three housing sections can be secured together by a plurality of bolts 56, only one of which is shown for clarity reasons, passing through aligned transverse bores 58 in the three housings with the bore 58 in one of the side housings being threaded to receive the threads of the bolts 56. To facilitate easy manufacture and eliminate the need for o-rings, the abutting faces of lower side section 52 and center section 50 are secured and sealed by a substance such as sold under the trade name "LOCKTIGHT". A similar treatment is applied to the abutting faces of the upper side section 54 in the center section 50.

Figure 2:
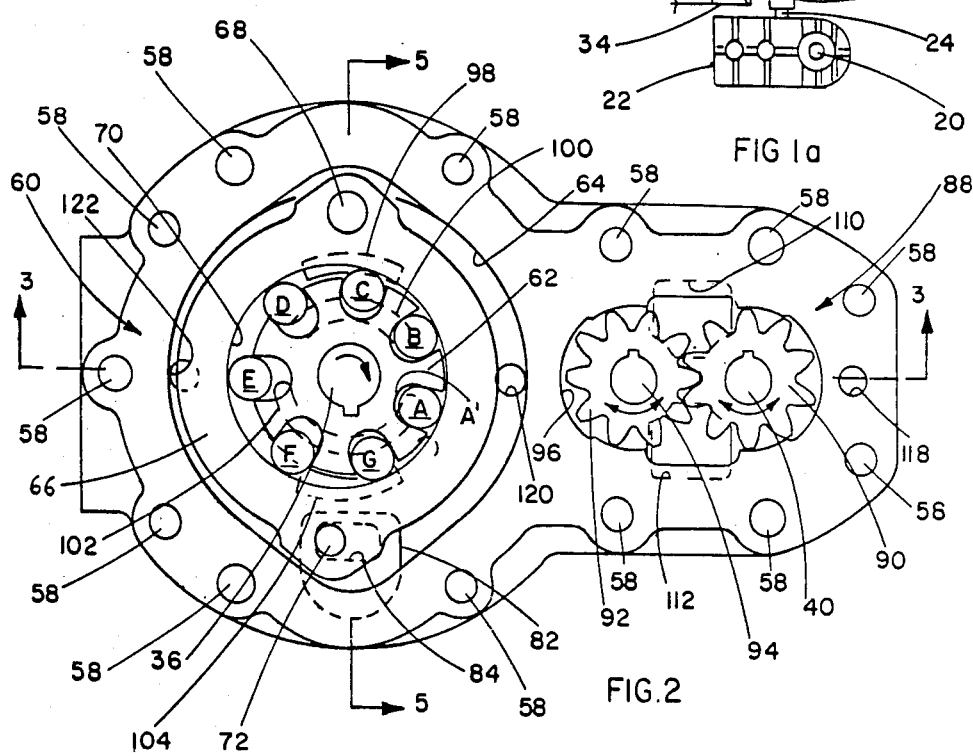
FIG. 2 is a sectional view taken along the lines 2—2 of FIG. 3 showing the center section of the hydrostatic transmission with the pump and motor elements.

The hydrostatic transmission 30 includes a pump 60 which in the preferred form is a variable displacement reversible pump. It is however contemplated that an alternative transmission could be used wherein the motor is the variable displacement unit. The pump chosen for simplicity of manufacture is a roller vane pump having a rotor 62 secured to the pump input shaft 36. The rotor 62 is positioned within a pump chamber 64 in part formed in the center section 50 of the pump housing and having side walls formed by the housing side sections 52 and 54. The pump chamber 64 is of the uniform cross section and extends through the full width W of the center section 50. The rotor 62 drives a plurality of roller vanes A-G in a clockwise direction, as shown in FIG. 2, when the pump shaft 36 is driven by engine 12 through the belt system. Also located within the pump chamber 64 is a swingable cam ring 66 pivotably mounted about an upper pin 68. The cam ring 66 has an inner peripheral circular surface 70 which is engaged by the rollers A-G to provide a plurality of sweeping, pumping volumes. The seven rollers are retained in seven pockets, such as pocket A' for roller A, equally spaced around the periphery of the rotor 62. The rollers cannot leave the rotor pockets due to the engagement with the circular cam surface 70. Not only are pumping volumes defined between the outer surface of the rotor 62 and the cam surface 70, but there are also pumping volumes defined by the roller pockets and the rollers which reciprocate radially therein. It is furthermore noted that the cam ring 66, the rollers A-G, and the rotor 62 all have a common width, which in the preferred form is equal to the width W of the center section 50 of the housing which defines the width of the pump chamber 64.

The cam ring 66 is provided with a pin 72 near the bottom thereof which provides the dual functions of transmitting a control input to the cam ring 66 for the positioning thereof and also limiting the amount of swing of the cam ring. The transmission upper side section 54 has a circular pocket 74 which receives a rotating input crank 76 operated by a transmission control handle 31 shown in FIG. 1. As seen in FIG. 6, the crank 76 has a central slot 78 which is in the centered position when the transmission is in neutral. The slot 78 receives a sliding block 80 which is pivotably secured to the pin 72. As the crank 76 is rotated due to a manual input, the block 80 and pin 72 can move side-by-side to generate a swinging movement of the cam ring 66. At the same time, the block 80 can slide in the slot so as to not cause a binding effect on the swinging movement of the pin 72 which is secured to the cam ring 76. The lower housing section 52 is provided with a pocket 82 opposite the pocket 74 of the upper side section 54. The cam ring pin 72 extends through the pocket 82 and into a deeper pocket 84 which is of lesser side-by-side extent than the pocket 82 and limits the side-by-side motion of the pin 72 and thus the amount of swinging motion of the cam ring 66. The deeper pocket 84, which limits the pin 72 motion can be seen in lower portions of FIGS. 2, 4 and 5. Located within the pocket 82 and surrounding the pin 72 are a plurality of belleville springs 86 which are used as a tolerance take-up and to prevent rattling.

When the cam ring 66 is in the neutral position, that is the pin 72 is centered in pocket 84, the cam ring 66 is concentric relative to the rotor 62. This provides a null or neutral position of the transmission with both the outer sweeping volumes between the rotor 62 and the cam surface 70 being of equal volume. Furthermore, each roller A–G is at an equal radial position relative to the center of rotor 62 and thus the pumping volumes beneath the rollers are of equal volume. When the pin 72 is moved in a first direction such as to the left as seen in FIG. 2, the cam ring 66 pivots around upper pin 68 to an eccentric position relative to rotor 62 which causes the pumping volumes on the right side of the pump chamber to decrease and the pumping volumes on the left side of the pump chamber to increase, which causes forward operation of the transmission as will be explained later. When the pin 72 is moved in the other direction such as to the right in FIG. 2, the cam ring 66 is pivoted to the right about upper pin 68 to again place the cam ring in an opposite eccentric position relative to the rotor 62. This causes reverse operation of the transmission 30 wherein the pumping volumes on the left of the pump are of deminished size and the pumping volumes on the right of the pump are of increased size. Since the pin 72 can be placed on either side of center within the limits defined by the deep pocket 84, not only is the pump reversible but it is of infinitely variable ratio as is well known in other types of hydrostatic transmissions. This not only eliminates the need of a mechanical gear box having a reverse gear, but also provides a speed change capability reducing the need for a multiple speed mechanical gear box unless multiple speed ranges are desirable as explained above.

The transmission 30 is also provided with a relatively standard gear motor 88 having a first gear 90 mounted on the transmission output shaft 40 and a second gear 92 intermeshing with the first gear 90 and mounted on an idle shaft 94. The gears 90 and 92 are positioned within a motor chamber 96 in part formed by the center section 50 of the transmission housing and having side walls formed by the housing side sections 52 and 54. Like the pumping chamber 64, the motor chamber 96 is of uniform cross section and extends the full width W of the center section 50. The gears 90 and 92 can rotate in either direction and thus the output to shaft 40 is reversible dependent upon the direction of fluid flow to motor 88 from pump 60.

In the preferred form of the hydrostatic transmission 30, the pump 60 is of the roller vane type and is reversible and of variable displacement whereas the motor 88 is of the fixed displacement gear type. As is known in the hydrostatic transmission art, these roles can be reversed wherein the motor would be both of variable displacement and reversible and wherein the pump would be of fixed displacement. It is also possible to have both the pump and motor of variable displacement and/or reversible but this would increase the complexity of the transmission and also require dual controls. With the type of transmission and housing contemplated, it is noted that both the pump and motor are of the rotating type and have at least one rotatable element, the rotor 62 of the pump 60 and the gear 90 of the motor 88, and wherein the volume of both the pump and motor is proportional to the width of the rotating elements and to the width of the chambers 64 and 96. In order to provide for simple manufacturing techniques, both the pump and motor have an equal width W which also happens to be the width of the center section 50 of the transmission housing. It is possible for the pumping elements to extend slightly into shallow cavities in both side housings 52 and 54 and wherein the shallow cavities would have the same general cross sections as the pumping chamber 64 and the motor chamber 66. However, this does complicate machining operations in forming the side cavities.

Another advantage of the preferred form of practicing the present invention and wherein both the pump and motor are in the same housing is that all connections between the pump and motor are not only internal and thus require no external hoses, but they are built into the two housing side sections 52 and 54 in a manner as will be explained below and which will permit a common pair housing side sections to be used with various width center sections 50 so as to increase or decrease the capacity of the transmission. A common pair of housing side sections in this sense does not mean that the two side sectons are identical with each other, but that a given side section 52 and a given side section 54 can be used with many center sections 50, thus eliminating the need to provide manufacturing tooling for many varying side sections. The pump chamber 64 and the motor chamber 96 of the center section 50 would still be of the same cross sections regardless of the width W of the center section 50. However, since the capacity of both the pump and motor is proportional to the width W of the center section, which is also the width of the pump and motor chambers, a change in width W will proportionally change the fluid capacity of both the pump and motor units in an equal amount. Thus, for a given fluid capacity ratio between the pump 60 and the motor 88, which in the case of the variable displacement pump would be the ratio of the maximum capacity of the pump 60 at full stroke to the capacity of the motor 88, the ratio will stay the same regardless of the width W of the center section 50. Thus the two side housing sections 52 and 54 which are more difficult to machine than the center section 50 or the rotating elements of either the pump or motor, are common to provide the transmissions having various capacities.

Figure 4:
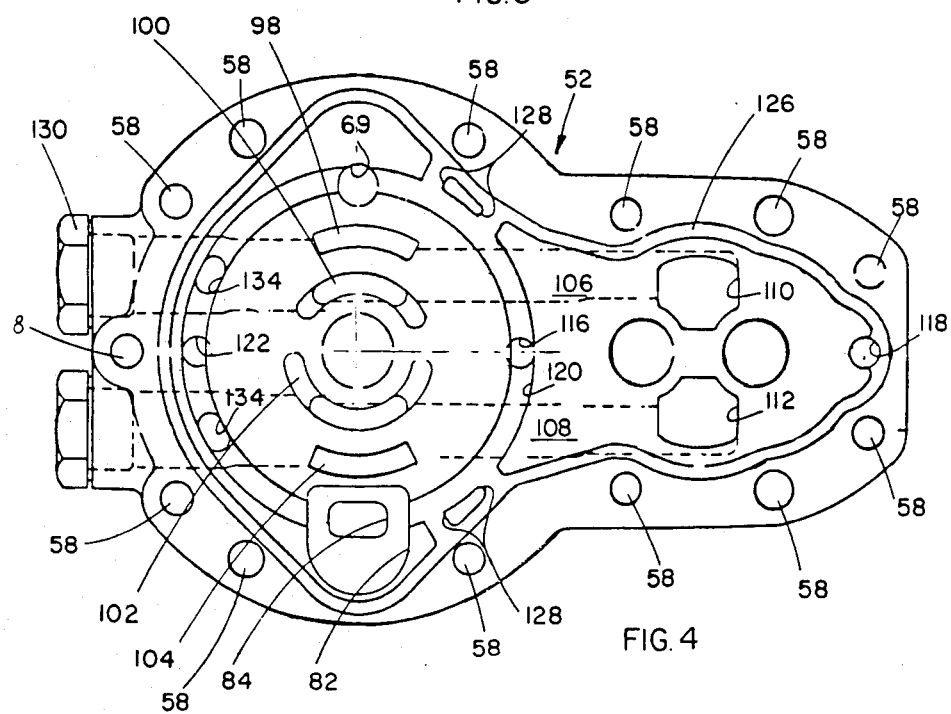
FIG. 4 is an elevated view of one of a pair of housing side sections and taken along lines 4—4 of FIG. 3.

In order to facilitate such manufacture of the transmission 30, both the pump 60 and the motor 88 have side porting, that is the ports are provided in the side walls of pump chamber 64 and motor chamber 96 formed by the housing side sections 52 and 54. The side porting is shown in solid lines in FIG. 4 showing the bottom housing side section 52 and as shown in dotted lines in FIG. 2 disclosing the relationship of the porting to the pump and motor rotating elements. Similar side porting is also provided in housing side section 54. The pump chamber 64 is provided with a first pump port 98 which is fluid communication with the outer sweeping volumes near the top of the pumping chamber. A second pump port 100 is located so as to be in fluid communication with the inner pumping pockets of the rotor 62 beneath the rollers B–D in the orientation shown in FIG. 2. A third pump port 102 is located so as to be in fluid communication with the inner pumping pockets on the lower side of the pump housing and thus beneath rollers E, F, G and A in the rotor orientation of FIG. 2. The fourth pump port 104 is located radially outward from the third pump port 102 and is in fluid communication with the sweeping volumes at the lower end of the pumping cavity. The first pump port 98 and the second pump port 100 are both in fluid communication with a fluid passageway 106 which extends between the pump 60 and motor 88. The third pump port 102 and the fourth pump port 104 are both in fluid communication with another fluid passageway 108 which also extends between the pump 60 and the motor 88. In a manner to facilitate construction and as seen in FIG. 4, the center portion of port 100 extends into the passageway 106 while the outer extremities are shallower grooves. The same is true for port 102 wherein the center section extends into passageway 108. The fluid passageway 106 is connected to a motor port 110 whereas fluid passageway 108 is connected to a motor port 112.

Thus, with the pump rotor 62 moving clockwise as seen in FIG. 2 and with the pump in the forward direction of operation, that is pin 72 and cam 66 moved to the left, the pumping volumes are increasing in the lower half of the pumping chamber drawing fluid from ports 102 and 104 while the pumping volumes are decreasing in the upper portion of the pumping chamber forcing fluid under pressure through ports 98 and 100. The high pressure fluid in passageway 106 enters the motor 88 through port 110 causing clockwise rotation of gear 90 and output shaft 40 for forward operation of the vehicle. The motor port 112 now acts as an outlet and has fluid at low pressure which passes through passageway 108 to pump ports 102 and 104 which are now acting as pump suction ports. Thus, the pump 60 and the motor 88 are in a closed loop circuit. When the pin 72 and cam ring 66 are moved over center to the right and with pump shaft 36 still being driven clockwise, the fluid operation of the transmission is reversed. The pumping volumes in the lower portion of the pump 60 are now decreasing in volume forcing fluid under high pressure through the ports 102 and 104, through passageway 108 to motor port 112 which is now the inlet port of the motor 88. This causes gear 90 and thus output shaft 40 to rotate counterclockwise for reverse operation of the transmission. The fluid leaving the motor 88 passes through motor port 110, passageway 106 to the first and second pump ports 98 and 100 which are now acting as the inlet or suction ports for the pump 66. As noted in FIG. 5, the fluid passages 106 and 108 along with all motor and pump ports can be duplicated by providing mirror image fluid communication passageways in both the lower housing side section 52 and the upper housing side section 54.

Figure 3:
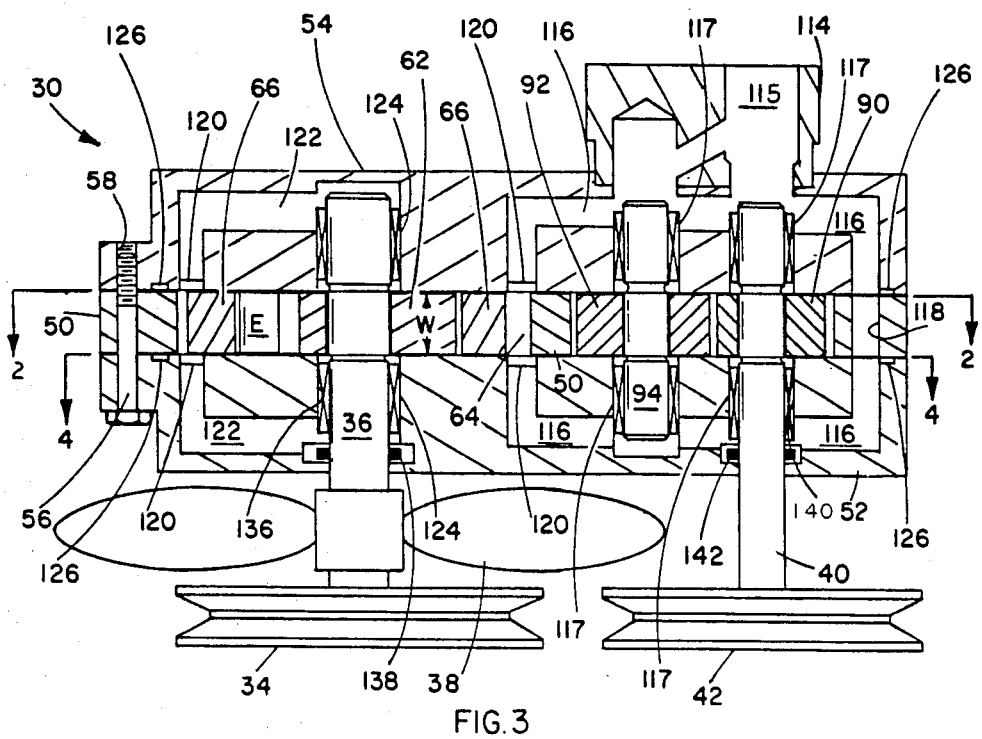
FIG. 3 is a sectional view of the hydrostatic transmission of the present invention generally taken along the lines 3—3 of FIG. 2 but showing the complete transmission and not just the center section thereof.

Not only are the main fluid passageways forming a closed loop transmission formed in the housing side sections as explained above, but also secondary fluid communication systems such as fluid leakage collection are also provided by the housing side sections 52 and 54. As seen in FIG. 3, the upper housing side section 54 has a fitting 114 with a bore 115. Passages 116 can be considered a small reservoir or can be adapted to be received by a larger external reservoir such as reservoir 48 in FIG. 1. The reservoir 48 normally is vented so that the secondary fluid communication system is at atmospheric pressure and also permits bleeding of any air bubbles that may be generated. Such system also assures that there is always a supply of make-up fluid.

The passage 115 provides hydraulic fluid under gravity feed from the reservoir 48 to internal drainage passageways 116 for motor shaft bearings 117 in both the upper and lower housing side sections 54 and 52, wherein the bearings are lubricated by leakage along the shafts. The drainage passageways 116 in the two housing side sections 52 and 54 are partly in fluid communication with each other by means of the bore 118 passing through the center section 50 at the right end of the housing as seen in FIGS. 2, 3 and 4. Also formed in each housing side section is an annular groove 120 whose outer periphery is generally the same size as the pumping cavity 64 formed in the center section 50. The radial extent of groove 120 is such that the groove is always radially outwardly from the cam circular surface 70 so as to not interfere with operation of the pump 66. The passages 116 are in communication with the grooves 120 of both side sections 52 and 54 so that fluid from the reservoir under the force of gravity is supplied to the pumping chamber 64. Also as seen in FIGS. 2, 3 and 4, the grooves 120 near the left end of the housing are in fluid communication with drainage passages 122 leading to bearings 124 for the pump shaft 36.

Figure 5:
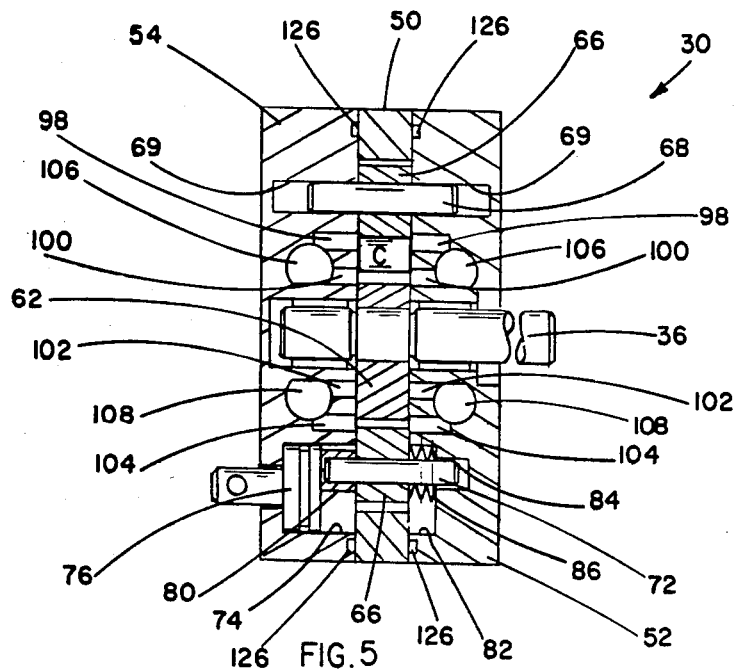
FIG. 5 is a sectional view of the hydrostatic transmission taken along lines 5—5 of FIG. 2 but not including the pump pulley and fan mounted on the shaft.
Figure 6:
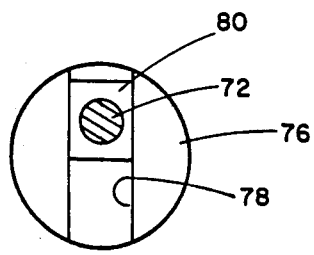
FIG. 6 is a face view of a control mechanism for the transmission pump.

As seen in FIGS. 3, 4 and 5, housing side section 52 is provided with a groove 126 which extends completely around the periphery of both pump and motor sections. As is well known in the hydraulic unit art, quite often there is outward fluid leakage from the pump and motor cavities, especially in areas subjected to high pressure. Such outward leakage is collected in groove 126 which is fluid communication with groove 120 via passages 128. This assures that any fluid leakage collected by the groove 126 is directed to the pumping chamber 64 which is substantially at atmospheric pressure. A similar groove 126 is also provided in the upper housing side section 54 as seen in FIG. 5.

Figure 7:
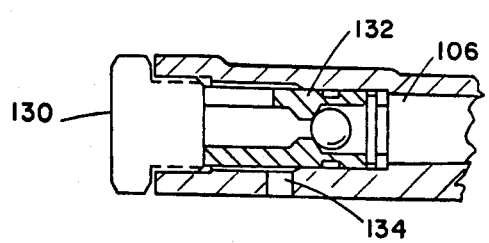
FIG. 7 is a partial sectional view of a check valve built into the transmission.

The main loop passageways 106 and 108 extend to the left end of the housing as seen in FIG. 4. This facilitates manufacture since these passageways can be bored from the end of the housing and are closed off by plugs 130. The extensions of the passageways 106 and 108 also provide means for locating a low pressure check valve 132 as seen in FIG. 7 and deleted from FIG. 4 for clarity reasons. The check valves 132 are in fluid communication with the circular grooves 120 via passages 134 shown in both FIGS. 4 and 7. The check valves 132 act as charge check valves and permit the supply of hydraulic fluid from the pump cavity 64 which is substantially at atmospheric pressure to either passage 106 or 108, whichever is in communication with the suction side of the pump 66, depending on whether the pump is in the forward or reverse mode of operation.

With the transmission 30 locating the orientation shown in FIGS. 1 and 3, it is noted that an input shaft bore 136 locating the lower pump shaft bearing 124 permits the input shaft 36 to extend downwardly to provide the proper orientation for pump pulley 34. A shaft seal 138 can also be provided in this general location. A motor shaft bore 140 locates the lower bearing 117 of the output shaft 40 which permits the shaft 40 to extend downwardly so as to locate motor pulley 42 also below the transmission housing. A shaft seal 142 can also be provided in this general location. This permits the orientation discussed above wherein both pulleys 34 and 42 are on the same side of the motor housing and located generally in a horizontal plane to permit the transmission 30 to be easily substituted in a tractor drive train such as seen in FIG. 1. When the pump housing is in such orientation, the reservoir 48 connects to the pump housing through fitting 114 and provides the desirable gravity feed to the rotating elements of the transmission 30.

In the preferred form of practicing the invention, it has been found advantageous to make the pair of housing side sections 52 and 54 from cast aluminum while the housing center section 50, the pump rotor 62, the pump ring 66, and the motor gears 90 and 92 are made of powdered metal and thus diminish any thermal expansion incompatibilities. The rollers A–G are cut from hardened metal bearing roller stock of 12 mm diameter. In order to provide a transmission which is suitable for use in a 11 horsepower front engine lawn tractor, a very compact transmission approximately 12 inches long is, provides which weighs approximately 12 pounds. Both the pump 60 at its maximum displacement and the motor 88, with the width W equal to 0.770 inch, have a fluid capacity of 0.87 cubic inch per revolution which has been found quite adequate for driving the front engine lawn tractor 10 with the engine speeds from 1,800 rpm to 3,600 rpm. Normal operating pressures of such transmission is in the neighborhood of 250 psi to 450 psi although this pressure level can approach 1,500 psi when the tractor is driven up steep hills or meets a severe obstacle at which time there will be wheel slip. Thus a very lightweight and compact transmission is provided by utilizing the construction details described above. Furthermore, such construction provides a very inexpensive transmission which is easy to manufacture utilizing standard manufacturing techniques. Thus, it is believed that the objects of the invention identified in the Summary of the Invention are fully met by the new and improved hydrostatic transmission taught herein.

I claim:

1. A hydrostatic transmission comprising a hydraulic pump driven by an input shaft and in fluid communication with a hydraulic motor having an output shaft, said pump having a pump rotating element which at least in part generates a pumping action and is operatively connected to said input shaft, said motor having a motor rotatable element operatively connected to the output shaft and subjected to fluid flow from said pump and at least in part providing a rotating output to said output shaft, a housing having a center section of uniform width and located between a pair of side sections, said center section being provided with a first opening of uniform cross section at least in part forming a pumping chamber and extending the width of said center section, said center section having a second opening of uniform cross section at least in part forming a motor chamber and also extending the width of said center section, said center section being of substantially the same width as said pumping chambers, said pumping chamber containing said pump rotating element with the fluid capacity of said pump being substantially proportional to the width of said pumping chamber, said motor chamber containing said motor rotatable element with the fluid capacity of said motor being substantially proportional to the width of said motor chamber, and said pumping chamber and said motor chamber being in side-by-side relationship, and wherein a transmission of selectable capacity which can be obtained by utilizing a common pair of housing side sections and selecting a width of the center section to provide the desired transmission capacity and wherein a ratio of pump capacity to motor capacity remains constant regardless of the width of center section selected.

2. The hydrostatic transmission of claim 1 wherein both said pump and motor have side porting with the pump ports and the motor ports being formed in at least one housing side section and the fluid communication between said pump and motor being provided by internal passages in said one housing side section.

3. The hydrostatic transmission of claim 2 wherein said pump ports and said motor ports are provided by ports in both of said pair of housing side sections and both of said pair of housing side sections have internal passages providing fluid communication between said pump and said motor.

4. The hydrostatic transmission of claim 1 wherein said pair of housing side sections have two parallel bores perpendicular to said center section, one of said bores permitting passage of said input shaft from said pump chamber to the outside of said housing and the other of said bores permitting passage of the output shaft from said motor chamber to the outside of said housing.

5. The hydrostatic transmission of claim 4 wherein both of said parallel bores are in one of said pair of side sections with each of said input and said output shafts mounting a pulley on the outside of said housing and said pulleys are in alignment with each other.

6. The hydrostatic transmission of claim 5 wherein the other of said pair housing side sections is adapted for fluid communication with a gravity feed hydraulic reservoir and the pump transmission is adapted for mounting with said other of said pair of housing side sections directed upwardly and said one of said housing side sections having said bores for said input and output shafts being directed downwardly.

7. The hydrostatic transmission of claim 4, wherein said bores position bearings for said input and said output shafts, said housing is connected to a fluid reservoir and said housing is provided with internal passageways placing said reservoir in fluid communication with said bearings and with said pumping chamber.

8. A variable ratio hydrostatic transmission comprising a housing having a hydraulic pump driven by an input shaft and in fluid communication with a hydraulic motor having an output shaft with one of said pump and motor is a variable displacement unit, said pump having a pump rotating element which at least in part generates a pumping action and is operatively connected to said input shaft, said motor having a rotatable motor element operatively connected to the output shaft and subjected to fluid flow from said pump to at least in part provide a rotating output, said housing having a constant width center section located between a pair of side sections, said center section having a first opening of uniform cross section in part forming a pumping chamber extending with width of said center section and containing said pump rotating element, said center section having a second opening of uniform cross section in part forming a motor chamber extending the width of said center section and containing said motor rotatable element, said pumping chamber and said motor chamber being in side-by-side relationship and perpendicular to the input and output shafts, said pump having a fluid capacity substantially proportional to the width of said pump chamber and said motor having a fluid capacity substantially proportional to the width of said motor chamber, and wherein said hydrostatic transmission may be of variable capacity by selecting the width of the center section of said housing while utilizing a common pair of said housing side sections and wherein the ratio of fluid capacity of said variable displacement unit in its maximum displacement position relative to the fluid capacity of the other of said units is kept constant.

9. The variable ratio hydrostatic transmission of claim 8 wherein said variable displacement unit is of the vane type, said variable displacement unit rotating element being a rotor connected to one of said shafts, said rotor having a plurality of radially outwardly extending pockets each having a vane therein, a swingable cam ring movable in a first direction from a neutral position toward a maximum displacement position, said cam ring having an internal surface engageable by said vanes, said cam ring in said neutral position being concentrically located relative to said rotor and said cam ring when moved from said neutral position being eccentrically located relative to said rotor.

10. The variable ratio hydrostatic transmission of claim 9 wherein said variable displacement unit is reversible whereby a constant direction of rotation of the input shaft provides a selected direction of rotation of said output shaft upon reversing operation of the said variable displacement unit.

11. The variable displacement hydrostatic transmission of claim 10 wherein said cam ring is movable from said neutral position in a direction opposite said first direction so as to position the cam ring eccentrically relative to said rotor for reverse operation.

12. The variable ratio hydrostatic transmission of claim 11 wherein said pump is the variable displacement unit and is of the roller vane type with said vanes being rollers, and said motor is of the gear motor type.

13. A hydrostatic transmission adapted to provide propulsion for a vehicle having an engine and a drive axle displaced from said engine, said hydrostatic transmission including a variable displacement hydraulic pump and a hydraulic motor mounted within a single multi section housing with the hydraulic pump and motor being in side-by-side relationship and in fluid communication with each other, said pump having a pump rotating element connected to an input shaft, said motor having a motor rotatable element connected to an output shaft, said pump input shaft being adapted to be driven by said engine, said motor output shaft being adapted to drive said axle of said vehicle, said housing comprising a constant width center section located between a pair of side sections said center section of said housing being of substantially the same width as said rotating element and said motor rotatable element, said housing center section having a first constant cross section opening passing therethrough and at least in part forming a pump chamber containing said pump rotating element with said pump having a maximum fluid capacity proportional to the width of said pump chamber, said central housing section having a second constant cross-section opening passing therethrough at least in part forming a motor chamber containing said motor rotatable element with said motor having a fluid capacity proportional to the width of said motor chamber, and said pump chamber and said motor chamber having the same width substantially equal to the width of said center section, and wherein said hydrostatic transmission may be of variable capacity by selecting the width of the center section of said housing while utilizing a common pair of said housing side sections and wherein the ratio of fluid capacity of said variable displacement pump in its maximum displacement position relative to the fluid capacity of said hydraulic motor is kept constant.

14. The hydrostatic transmission of claim 13 wherein one of said pump and said motor is a variable displacement unit, said variable displacement unit is reversible and in fluid communication with the other of said units in the manner which provides variable speed drive to said motor shaft in a first direction when said transmission is in a forward mode of operation and provides variable speed drive to said motor shaft in an opposite direction when said transmission is in a reverse mode of operation, said engine drive to said pump input shaft being in a constant direction of rotation while the output from said motor output shaft to said vehicle axle being reversible dependent upon the mode of operation of said transmission.

15. The hydrostatic transmission of claim 14 wherein said input shaft and said output shaft are parallel to each other, one of said pair of housing side sections having a pair of parallel bores adapted to receive said input shaft and said output shaft whereby said input shaft and said output shaft extend through said one of said pair of side sections, said vehicle engine having a vertical shaft and having an engine pulley located thereon beneath said engine, said pump input shaft and said output shaft being of vertical orientation with said input shaft having a pump pulley mounted thereon, and wherein a drive belt located in a substantially horizontal plane interconnects said engine pulley and said pump pulley.

16. The hydrostatic transmission of claim 15 wherein said vehicle axle has a differential having a vertical input shaft and said vertically oriented motor output shaft is adapted to be connected to the differential input shaft.

17. The hydrostatic transmission of claim 16 wherein said motor shaft has a motor pulley mounted thereon and said differential input has a differential pulley mounted thereon, a driven belt interconnecting said motor pulley and said differential pulley, and wherein said engine pulley, said drive belt, said pump pulley, said motor pulley, said driven belt and said differential pulley are all located in the same substantially horizontal plane.

18. The hydrostatic transmission of claim 17 wherein said one of said pair of housing side sections is located beneath said center section of said housing.

19. The hydrostatic transmission of claim 18 wherein the other of said pair of housing side sections is located above said center section and adaptable to be in gravity feed fluid communication with a hydraulic reservoir.

20. The hydrostatic transmission of claim 19 wherein said pump is a reversible roller vane pump and therein said motor is a fixed displacement gear motor.

21. The hydrostatic transmission of claim 20 wherein said pump and said motor have side porting with both of said pair of said housing side sections having fluid ports in communication with said pump chamber and said motor chamber and having internal passages providing the fluid communication between said pump and said motor.

22. The hydrostatic transmission of claim 19 wherein said pump housing has internal passageways in fluid communication with said reservoir and in fluid communication with said pumping chamber.

23. The hydrostatic transmission of claim 16 wherein said differential includes a multiple gear change transmission having only forward gearing and wherein multiple speed ranges of operation for said vehicle are provided.

* * * * *